(12) United States Patent
Kerkau et al.

(10) Patent No.: US 6,343,578 B1
(45) Date of Patent: Feb. 5, 2002

(54) DEVICE AND METHOD FOR VARIABLE VALVE TIMING IN AN INTERNAL COMBUSTION ENGINE

(75) Inventors: Martin Kerkau, Ötisheim; Matthias Hofstetter, Ringsheim, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/658,266

(22) Filed: Sep. 8, 2000

(30) Foreign Application Priority Data

Sep. 8, 1999 (DE) .......................... 199 42 746
Jan. 22, 2000 (DE) .......................... 100 02 771

(51) Int. Cl.$^7$ ................................. F01L 1/34
(52) U.S. Cl. ....................... 123/90.15; 123/90.18; 123/90.31
(58) Field of Search ................ 123/90.15, 90.16, 123/90.17, 90.18, 90.31, 90.11, 90.27, 90.6

(56) References Cited

U.S. PATENT DOCUMENTS

| 5,353,756 | A | * | 10/1994 | Murata et al. | ............ | 123/90.16 |
|---|---|---|---|---|---|---|
| 5,417,191 | A | * | 5/1995 | Togai et al. | ............. | 123/90.15 |
| 5,494,008 | A | * | 2/1996 | Ohkawa et al. | .......... | 123/90.17 |
| 5,778,840 | A | * | 7/1998 | Murata et al. | ........... | 123/90.17 |
| 5,809,955 | A | * | 9/1998 | Murata et al. | ........... | 123/90.17 |
| 5,826,551 | A | * | 10/1998 | Janse van Vuuren | .... | 123/90.16 |
| 5,931,124 | A | * | 8/1999 | Kerkau et al. | ........... | 123/90.15 |
| 5,931,128 | A | * | 8/1999 | Murata et al. | ........... | 123/90.17 |
| 5,992,361 | A | | 11/1999 | Murata et al. | ........... | 123/90.17 |
| 6,213,069 | B1 | * | 4/2001 | Wada et al. | ............. | 123/90.15 |
| 6,234,144 | B1 | * | 5/2001 | Yamaguchi et al. | ..... | 123/90.11 |

FOREIGN PATENT DOCUMENTS

DE 198 14 888 11/1998

* cited by examiner

Primary Examiner—Teresa Walberg
Assistant Examiner—Fadi H. Dahbour
(74) Attorney, Agent, or Firm—Crowell & Moring LLP

(57) ABSTRACT

Internal combustion engine having a device for the valve timing, the valve timing periods and the valve lifts being continuously changeable and being definable as a function of the operating parameters of the internal combustion engine, characterized in that the switching thresholds for changing the valve timing periods and the valve lifts, which are obtained from a characteristic diagram extending over the rotational speed and the load, are weighted as a function of the gear and/or of the temperature.

18 Claims, 2 Drawing Sheets

DEVICE AND METHOD FOR VARIABLE VALVE TIMING IN AN INTERNAL COMBUSTION ENGINE

BACKGROUND AND SUMMARY OF THE INVENTION

This application claims the priority of German patent application DE 199 42 746.1, filed in Germany on Sep. 8, 1999 and German patent application DE 100 02 771.7, filed in Germany on Jan. 22, 2000, the disclosures of which are expressly incorporated by reference herein.

The invention relates to an internal combustion engine having a variable valve timing. It is known that a charging cycle has two decisive requirements. On the one hand, by means of an exchange, the working gas is brought to the starting condition of the cyclic process and, on the other hand, the oxygen required for the fuel combustion is provided in the form of fresh air. The opening and closing of the valves for the charge cycle takes place by means of the camshaft. Pins or pushrods are normally engaged with a camshaft for this purpose. The pushrods are used to press out the used-up gas and take in the fresh gases by operating to press the separately designed charge cycle valves against the valve springs. Thus, shortly before the upper dead center, the intake valve opens up while the outlet valve is still open. The outlet valve closes shorter after the upper dead center and, while the intake valve is open, the piston, which moves downward, can take in fresh air. The time, during which both valves (intake and outlet valve) are both open simultaneously is called the overlapping time or overlapping surface. The overlapping time and the size of the valve lifts are significant for the provided torque and are therefore responsible for the engine output and thus also for the driving comfort. The switching thresholds for the continuous change of the valve timing periods and of the valve lift are determined as a function of the rotational speed and of the load applied to the internal combustion engine and are stored in a corresponding characteristic rotational speed—load diagram. The variable valve timing per se is a rather complicated solution of spatial cam profiles on a longitudinally displaceable camshaft but permits a clear torque gain in the entire rotational speed range of the engine.

From German Patent Document DE 198 14 888 A1 (corresponding to U.S. Pat. No. 5,992,361), a variable valve timing mechanism is known, in the case of which the characteristic valve lift curve is changed in order to achieve an optimal engine output power. The valve timing mechanism is arranged on the side of the intake valve and/or the outlet valve. Here, at the start of a change of the operating condition of the internal combustion engine from a low rotational engine speed to a high rotational engine speed, the valve opening duration of the intake valve and/or of the outlet valve is changed such that the overlapping duration of the intake valve and the outlet valve is increased. As a result, it is possible to ensure a uniform course of the torque curve also during the transition from the low rotational engine speed to the high rotational engine speed and to avoid step-type sections in the course of the torques which reduce the driving comfort. The acceleration therefore takes place in a steady manner.

An object of the present invention is to provide improvements in the engine operation as compared to the prior art arrangements.

At least this object is achieved by preferred embodiments of the invention by providing an arrangement where the switching thresholds are weighted in response to respective engaged transmission gears and/or respective engine operating termperatures.

As a result of a weighting of the switching thresholds according to the invention for a change of the valve timing periods and of the valve lift by the respective engaged gear and/or the engine temperature, it is achieved that a small valve lift can be used, as desired, into high load and rotational speed ranges, which has a positive effect on the fuel consumption. Simultaneously, when switching from a small to a large valve lift, no torque jump will occur and a jolt-free operation of the internal combustion engine is therefore possible.

A known switching threshold for a switch-over of the valve lift is defined as a function of the load and the rotational engine speed. For reasons of fuel consumption, it is endeavored to operate the internal combustion engine in a largest possible operating range with a small valve lift. Advantageously, the defining of the switching thresholds is determined in the application or on an engine test bed and is then stored as corresponding values in the characteristic rotational speed-load diagram in the control unit. By means of the suggested solution, it is achieved that, also at high speeds, the operation can take place at a small valve lift which is favorable with respect to the fuel consumption. During the switching-back, the valve lift switch-over does not take place to the same value in the characteristic rotational speed—load diagram but offset by a selectable or definable difference. Thus, the curve of the valve switching has the shape of a hysteresis which, in addition is dependent on the gear, whereby the driving comfort is improved further.

Other objects, advantages and novel features of the present invention will become apparent from the following detailed description of the invention when considered in conjunction with the accompanying drawings.

BRIEF DESCRIPTION OF THE DRAWINGS

Embodiments of the invention are illustrated in the drawing and are explained in detail in the following description.

DETAILED DESCRIPTION OF THE DRAWINGS

Figure 1A:
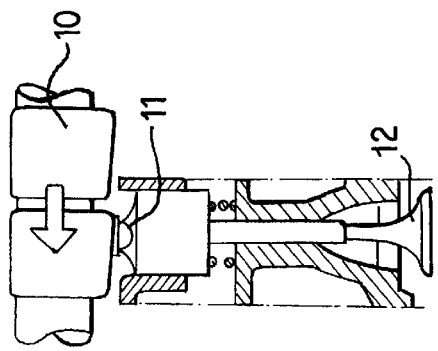
FIG. 1a is a basic diagram for the implementation of a minimal valve lift.
Figure 1B:
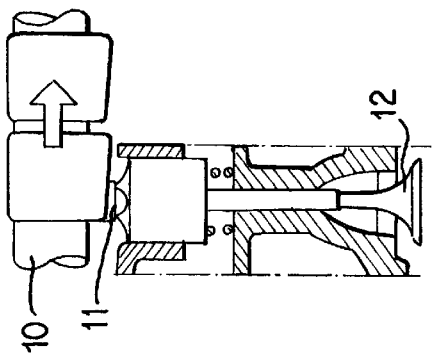
FIG. 1b is a basic diagram for the implementation of a maximal valve lift.

FIGS. 1a and 1b each show a basic arrangement of a camshaft 10 with an assigned valve 12 which is opened and closed again during the rotation of the camshaft by a pin or pushrod 11 arranged on the camshaft 10. The valve is held in its inoperative position by means of a spring. The adjustment of the opening of the valve and the adjustment of the extent of the valve lift takes place by a corresponding displacement of the camshaft along its longitudinal axis. In FIGS. 1a and 1b, the displaceability of the camshaft along its longitudinal direction is symbolically indicated by an arrow in the axial direction in the camshaft. In FIG. 1a, the opening of the valve is indicated with a small or minimal lift and in FIG. 1b, the valve opening is shown with a maximal lift.

Figure 2:
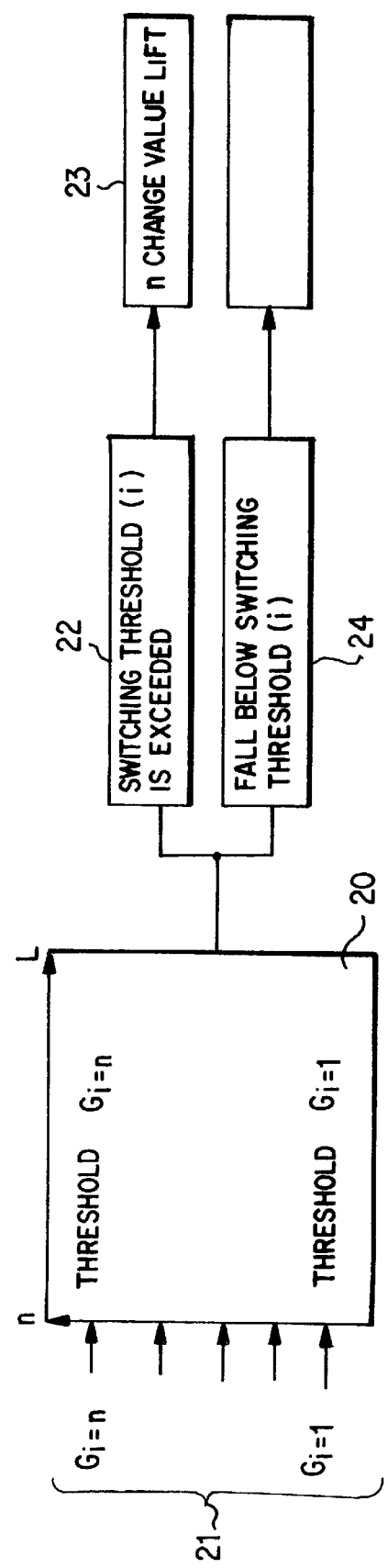
FIG. 2 is a schematic representation of the solution according to the invention.

FIG. 2 is a basic arrangement for implementing the solution according to the invention. Reference number 20 symbolically indicates the characteristic diagram in which the switching thresholds for the valve timing are filed. The characteristic diagram 20 extends over the rotational speed n and the applied load L. Another important input quantity, which is provided with reference number 21 in FIG. 2, is the ratio of the gearing to the power transmission, which colloquially is called "gear". For the purpose of clarification, the individual gears are indicated by the symbols $G_{i=1}$ to $G_{i=n}$.

When passing through the individual operating ranges, the switching thresholds for the switching of the valve lifts and the valve timing periods therefore vary. When a threshold is exceeded which is defined for the respective gear $G_i$, this exceeding is recognized in an operating step 22, and, in an operating step 23, a switching takes place from a small valve lift to a large valve lift. When later there is again a falling-below of the switching threshold, this is recognized in an operating step 24, and the valve lift change-over takes place again from large to small. For an optimal uniform course of the torques, the switch-over of the valve lift from large back to small does not take place precisely when there is a falling below the stored switching threshold for the upshifting, but a definable difference is taken into account, so that the switching behavior of the valves takes place in a hysteresis. As a result of this switching behavior, it is ensured that a continuous torque course is ensured during the upshifting as well as during the downshifting from one gear to another.

Figure 3:
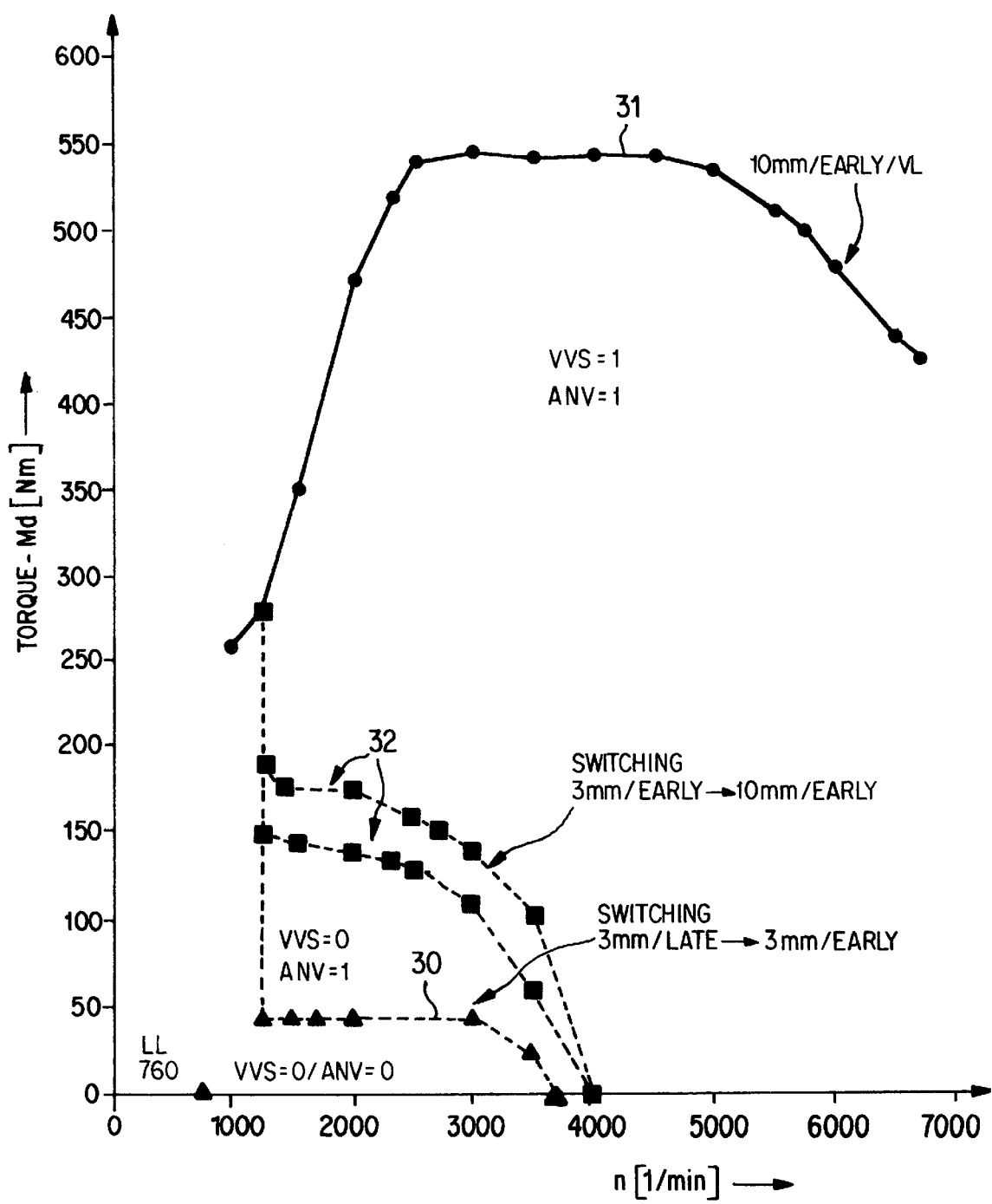
FIG. 3 is a characteristic rotational speed-load diagram with indicated switching thresholds for changing the valve timing.

FIG. 3 is a more detailed view of a characteristic rotational speed-load diagram in which different switching thresholds are illustrated for a valve switch-over. The rotational speed n is shown on the abscissa and the load or torque Md is shown on the ordinate. Three different curves 30, 31 and 32, which indicate different switching thresholds, are indicated in the characteristic diagram.

The first curve 30 is defined by the points arranged in a triangular shape. It indicates a first switching threshold, at which the control timing for the valves switches over from late to early while the lift continues to be minimal.

The second curve 31, which is defined by individual round points, shows the switching threshold, at which the valve timing causes a large or maximal valve lift and an early valve opening with a long overlapping time. Therefore, the internal combustion engine has a correspondingly large torque at full load.

Gear-dependent switching thresholds are indicated between the first curve 30 and the second curve 31. These switching thresholds 32 are defined as a function of the gear and are determined, for example, in the application on the engine test bed. In the case of these switching thresholds, the valve timing period remains the same and a switch-over therefore only takes place from a small valve lift to a large valve lift. Advantageously, a hysteresis can be taken into account in the case of these switching thresholds. Also during the switching-back of the valve lift from a large to a small valve lift, the momentarily engaged gear at the vehicle is taken into account. As a result, a high driving comfort which is accompanied by a low fuel consumption is also obtained when braking.

In addition to taking into account the engaged gear at the internal combustion engine in the case of the variable valve timing, the momentary temperature of the internal combustion engine also has a considerable influence on the variable valve timing. It was found that, specifically at low temperatures, the taking into account of the engine temperature has a positive effect on the vehicle handling. As a relevant value for judging the temperature, the engine oil temperature is used because this temperature supplies actual information concerning the temperature conditions existing in the engine.

In a first low temperature range to, for example, minus 30° C., the engine is started at a small lift and, after a stable rotational idling speed has been reached, the valve is controlled with a maximal or large lift, and, also at low rotational speeds, no valve lift switch-over will then take place to a small valve lift. In a second medium temperature range, which ranges, for example, from −10° C. to +35° C., under certain circumstances, despite different switching thresholds in the characteristic diagram, a large valve lift continues to exist in order to, in this manner, heat the catalyst as fast as possible to the operating temperature and to lower the crude emissions. Subsequently, the engine will be warm and the operation can take place by means of the characteristic diagrams filed in the control unit. A valve timing will then take place which corresponds to the switching thresholds filed in the characteristic diagrams.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Internal combustion engine having a device for variable valve timing, valve timing periods and valve lifts of the variable valve timing being definable as a function of operating parameters of the internal combustion engine, switching thresholds for changing the valve timing periods and/or the valve lifts being filed in a characteristic diagram which extends over a rotational speed and a load of the internal combustion engine, wherein the switching thresholds are changed as a function of a currently engaged gear and/or as a function of a temperature of the internal combustion engine.

2. Internal combustion engine according to claim 1, wherein a determination of the switching thresholds takes place.

3. Internal combustion engine according to claim 1, wherein the switching thresholds are changed as a function of a currently engaged gear and the gear-dependent switching threshold provides a substantially no-jolt operation of the internal combustion engine during a change in valve lift.

4. Internal combustion engine according to claim 1, wherein a hysteresis for a back-switching of the valve lift is defined as a function of the currently engaged gear.

5. Internal combustion engine according to claim 1, wherein the switching thresholds are changed as a function of a temperature of the internal combustion engine.

6. Internal combustion engine according to claim 3, wherein the switching thresholds are changed as a function of a temperature of the internal combustion engine.

7. A method of providing a variable valve timing in an internal combustion engine comprising:
   filing switching thresholds into a control unit of the internal combustion engine as a characteristic rotational speed-load diagram, the switching thresholds being used for changing at least one of a valve timing period and a valve lift;
   weighting the switching thresholds as a function of at least one of a currently engaged transmission gear and a temperature of the internal combustion engine;
   operating the internal combustion engine so that it passes through individual operating ranges; and determining if a switching threshold has been exceeded and switching from a small valve lift to a large valve lift if a switching threshold has been exceeded.

8. The method of claim 7, wherein after the switching threshold has been exceeded and a large valve lift exists, switching from the large valve lift to the small valve lift if it is determined that an operating range is below the switching threshold.

9. The method of claim 7, wherein the switching of the valve lift takes place in a hysteresis such that the switching from the large valve lift to the small valve lift does not take place at a condition defined by when the operating range falls below the switching threshold for switching from a small valve lift to a large valve lift.

10. The method of claim 7, wherein the switching thresholds are weighted as a function of a currently engaged gear and the gear-dependent switching threshold provides a substantially no-jolt operation of the internal combustion engine during a change in valve lift.

11. The method of claim 7, wherein the switching thresholds are weighted as a function of a temperature of the internal combustion engine.

12. The method of claim 10, wherein the switching thresholds are weighted as a function of a temperature of the internal combustion engine.

13. An internal combustion engine having a device for variable valve timing comprising:

a control unit;

a valve;

an axially displaceable camshaft in operative connection with the valve and having a plurality of cams which are axially displaceable with the camshaft for varying a valve timing period and a valve lift of the valve;

means for filing switching thresholds into the control unit as a characteristic rotational speed-load diagram;

means for weighting the switching thresholds as a function of at least one of a currently engaged gear and a temperature of the internal combustion engine; and means for determining if a switching threshold has been exceeded and then displacing the axially displaceable camshaft to change the lift of the valve from a small valve lift to a large valve lift.

14. The internal combustion engine of claim 13, further including means for determining, during the condition of a large valve lift, if an operating range of the internal combustion engine is below the switching threshold and displacing the axially displaceable camshaft to change the lift of the valve from the large valve lift to the small valve lift.

15. The internal combustion engine of claim 14, wherein the switching of the valve lift takes place in a hysteresis such that the switching from the large valve lift to the small valve lift does not take place at a condition defined by when the operating range falls below the switching threshold for switching from a small valve lift to a large valve lift.

16. Internal combustion engine according to claim 13, wherein the switching thresholds are weighted as a function of a currently engaged gear and the gear-dependent switching threshold provides a substantially no-jolt operation of the internal combustion engine during a change in valve lift.

17. Internal combustion engine according to claim 16, wherein the switching thresholds are weighted as a function of a temperature of the internal combustion engine.

18. Internal combustion engine according to claim 13, wherein the switching thresholds are weighted as a function of a temperature of the internal combustion engine.

* * * * *